Figure 1:
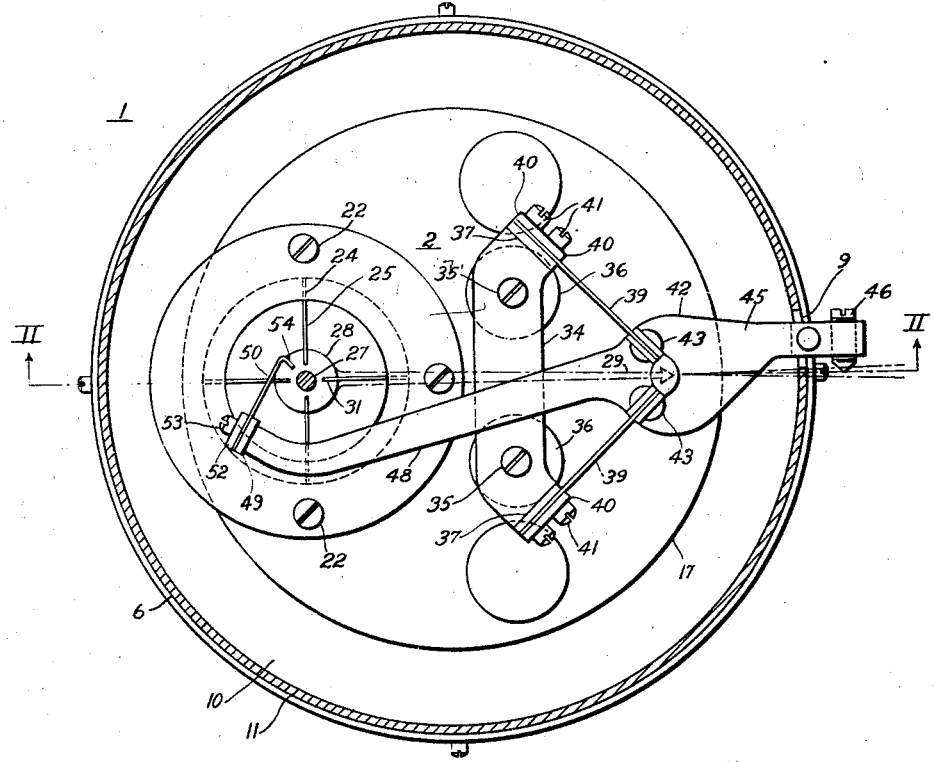

Feb. 19, 1929.

W. E. TRUMPLER 1,702,455

VIBRATION INDICATOR

Filed June 27, 1925

WITNESSES:

INVENTOR
William E. Trumpler.
BY
ATTORNEY

Patented Feb. 19, 1929.

1,702,455

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

VIBRATION INDICATOR.

Application filed June 27, 1925. Serial No. 39,996.

My invention relates to indicators and particularly to vibration indicators for accurately determining the vibration of machine parts such as the rotors of dynamo electric machines.

One object of my invention is to provide a precision instrument, of the character designated, that shall be so entirely free from frictionally engaging and rolling surfaces as to be more accurately and directly responsive to mechanical movements.

Another object of my invention is to provide a vibration indicator that shall be free from clearances, delicate adjustments and wear.

Another object of my invention is to provide a vibration indicator in which the flexibility of a suspended system is in such relation to the masses of the moving parts that the frequency of vibration of the system is close to the frequency of the vibrations measured, thereby requiring relatively small forces to actuate the indicator mechanism.

Another object of my invention is to so flexibly support or suspend the moving parts of a precision instrument as to eliminate friction and other retarding forces and to prevent movement of the parts in undesired directions as a result of the flexible suspension.

A further object of my invention is to provide a vibration indicator that shall be neat and compact in construction, readily portable and adapted for application in service, and capable of withstanding rough usage.

With such objects in view, as well as other advantages which may be incident to the utilization of the improvement, the invention consists in the parts and combinations thereof hereinafter set forth and claimed, with the understanding that the several necessary elements constituting the same may be varied in proportion and arrangement without departing from the nature and scope of the invention.

My copending application, Serial No. 736,458, filed September 8, 1924, sets forth a machine for measuring the dynamic unbalance of the rotors of dynamo-electric machines, to which reference may be had for a more full and complete understanding of one specific application for which my present invention is adapted.

In any precision instrument employing mechanically movable parts, the presence of frictionally engaging surfaces and other retarding influences has a direct and important bearing on the degree of accuracy with which the instrument operates and on the reliability of the results obtained. This is particularly true in connection with vibration-indicating instrument, where the quantity being measured is also a mechanical movement.

In connection with balancing machines, as set forth in the above-mentioned copending application, it is of great importance that the frictional resistances in the indicator be minimized. As most balancing machines operate on the resonance principle, the amplitude of vibration is a large multiple of the actual eccentricity of the rotating elements. The small forces also have to actuate the indicator which, in a certain way, may be considered as a part of the vibrating system of the balancing machine. Since the indicator is used for amplifying the motions to make them visible, any frictional resistance will produce a damping to the vibrating system, reduce the amplitude of the vibrations of the whole system and increase the range of unbalance within which there is no response at all. While every effort is expanded to reduce frictional resistances in the vibrating system of the balancing machine, it is even more important on the part of the indicator where the motions are greatly increased.

It is my aim to provide an instrument that shall not only overcome all of the above-mentioned objections but that shall also be neat and compact, easy to operate, proof against ready damage and accurate to a high degree.

Accordingly, in practicing my invention, I provide an instrument in which the movable parts are flexibly or yieldably suspended and connected, independently of frictional-engaging and rolling surfaces, that are prevented from movement in undesired directions and that are also so constructed and related as to render the device extremely sensitive, accurate and durable.

In order to make the invention more clearly understood means are shown in the accompanying drawings for carrying the same into practical effect without limiting the improvements in these useful applications to the particular constructions which, for the purpose of explanation, are made the subject of illustration.

Figure 2:
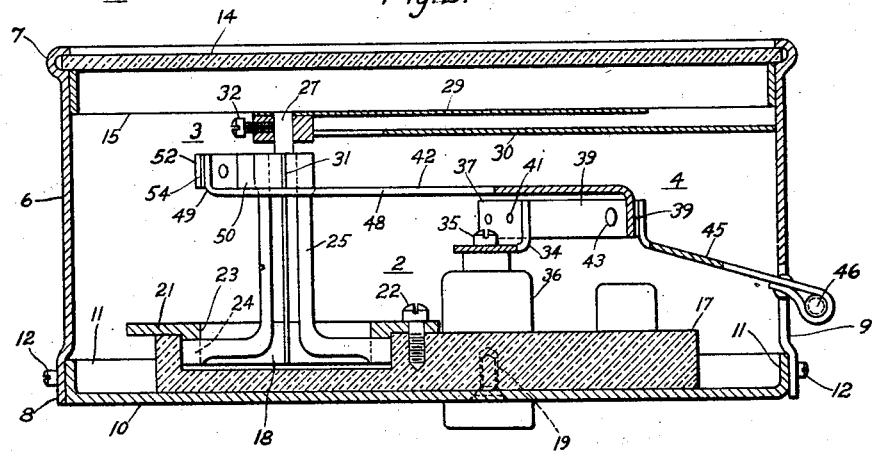

Figure 1 of the accompanying drawings is a plan view, partially in section and partially in elevation, of a vibration indicator constructed in accordance with my invention, and Fig. 2 is a view of the device shown in Fig. 1 taken along line II—II thereof.

The device comprises, in general, a casing 1, a movable-part supporting structure 2 therein, an indicating element or structure 3 and an actuating structure 4 for the indicating element 3.

The casing structure 1 preferably comprises a cylindrical sheet metal side wall member 6 having upper and lower flanges 7 and 8, respectively, and a side aperture 9 for a purpose to be hereinafter set forth. A bottom wall member 10 is provided with an upturned side flange 11, that telescopically fits in the lower flange 8 of the side wall member 6 and is secured thereto as by screws 12. A transparent cover plate 14 is held against the upper flange 7 as by a retaining collar member 15.

The movable-part supporting structure 2, preferably comprises a supporting block or disk 17 of material that is provided with a cylindrical recess 18 and is suitably secured to the bottom wall member 10 as by screws 19.

The indicating element or structure 3 comprises a member 21 of substantially ring shape having an upper flange that is secured to the block 17, as by screws 22, and a depending flange 23 disposed in the recess 18 in the insulating supporting block 17. The flange 23 is provided with a plurality of relatively narrow radial slots 24 in its underside that are adapted to receive the outer ends of a plurality of flexible elements 25.

The elements 25 are preferably constructed of relatively thin resilient sheet metal to be of substantially L-shape having the outer ends of their lower or horizontal arms snugly or rigidly fitted in the slots 24 and the vertical arms thereof disposed in substantially parallel relation to each other about a central axis. This axis constitutes the pivotal axis of a relatively short shaft or pin 27 that is secured to the arms 25, as by a drum or bushing 28, and carries a pointer 29 for cooperation with a scale plate 30 secured to the side wall member 6. The bushing 28 is provided with vertical radial slots 31 for the reception of the upper ends of the arms 25.

The actuating element 4 comprises a bracket 34 that is secured as by screws 35 to a pair of standards 36 that are mounted on the insulating supporting block 17. The pointer 29 is secured to the pin 27, as by a set screw 32. The bracket 34 is preferably of sheet or strap metal construction having an intermediate portion bridged between the standards 36 and having diagonally related upturned end flanges 37. Resilient sheet metal or leaf spring members 39 which are secured to the flanges 37, as by plates 40 and screws 41, project away from the flanges 37 along diagonally related lines toward a point of intersection adjacent to which a pivotally movable actuating arm 42 is secured as by rivets 43.

The arm 42 comprises an arm 45 which projects through the aperture 9 in the side wall member 6 and is bent and riveted in position around an adjustable screw contact member 46. The arm 45 further comprises a relatively long inwardly projecting lever arm 48 having a laterally bent end portion 49 adjacent to the pivot axis of the pin 27. A resilient metal strap element 50 is connected, adjacent to one end, to the flange 49 as by a plate 52 and a screw 53 and, adjacent to its other end, to the bushing 28. At the latter end the element 50 is secured to the bushing 28 by a snug fit in a slot 54 similar to the manner in which the arms 25 are secured in the bushing.

In operation, the contact member 46 is placed in engagement with a vibrating part of which an indication is desired, under sufficient pressure to always remain in engagement with the part. Movement of the member 46 causes the arm 42 to laterally bend the leaf spring members 39 and to move about a vertical axis at the intersection of these springs. This movement is transmitted through the arm 48 to the flexible element 50 which, being in an initial tangential position with the element 28, transmits its movement directly thereto about the axis of the pin 27.

This movement not only deflects the horizontal arms of the elements 25 laterally to their planes but also torsionally twists the vertical arms thereof to permit a considerable movement of the pointer 29 without any severe bending at any local position. Thus a minute movement of the member 46 is materially magnified by the pointer 29 free from frictionally engaging and rolling surfaces and without back-lash or lost motion.

The flat-strap construction and relation of the elements 25, 39 and 50 reinforces the same against bending or displacement in the directions of the planes thereof and readily permits the movement for which they are intended.

While the flexible elements 25 of the indicating element are shown as substantially L-shaped, which represents a preferred shape, they may be of any other shape so long as they each lie in one plane and the planes of the different elements intersect in the same line which is the axis of rotation.

I claim as my invention:

1. An indicator comprising a supporting member, a pivotally-movable actuating member, a pivotally-movable indicating member for magnifying the movements of the actuating member and resilient flexible means connecting said movable members to each other and each thereof to said supporting member.

2. An indicator comprising a supporting member, a pivotally movable member, and a plurality of elongated laterally bendable elements having arms grouped about the pivotal axis of said movable member in substantially parallel relation thereto and arms extending radially from said first arms to said supporting member, the movable member being mounted on said first arms.

3. An indicator comprising a supporting member, a pivotally movable member, and a plurality of resilient flat-strap members of substantially L-shape disposed in radial planes about the pivotal axis of said member with the movable member secured in suspended position adjacent to the ends of arms of said resilient members that extend substantially parallel to the pivotal axis, said strap members being supported adjacent to the outer ends of arms thereof that extend radially from said first arms to said supporting member.

4. An indicator comprising a supporting member, a pivotally movable member, and yieldable means having a portion extending laterally to the pivotal axis of said movable member and secured to the supporting member and a portion extending substantially parallel to said axis on which the movable member is mounted.

5. An indicator comprising a relatively-slightly pivotally movable actuating member having a relatively long lever arm, a pivotally movable indicating member, and a resilient flexible element extending between fixed positions adjacent to the outer end of said lever arm and adjacent to the pivotal axis of the indicating member.

6. An indicator comprising a relatively-slightly pivotally-movable actuating member having a relatively long lever arm, an indicating member pivotally movable about an axis substantially parallel to the pivotal axis of said actuating member, and a flexible spring element having its flat sides disposed in planes substantially parallel to said axes, said element being fixedly connected adjacent to its ends with said lever arm adjacent to the outer end thereof and to said indicating member adjacent to the pivotal axis of the latter.

7. A vibration indicator comprising a casing, a supporting member secured in position therein, a pivotally-movable pointer, leaf-spring members extending between the supporting member and the pointer for supporting the latter, an actuating member extending from a position adjacent to the pivotal axis of the pointer, through an aperture in the casing, to a position exterior to the casing, leaf-spring members extending between the supporting member and the actuating member for supporting the latter, and a flexible element fixedly connected adjacent to one end to said pointer and adjacent to its other end to said supporting member.

In testimony whereof, I have hereunto subscribed my name this 4th day of June, 1925.

WILLIAM E. TRUMPLER.